US006418483B2

(12) United States Patent
Nilsson

(10) Patent No.: US 6,418,483 B2
(45) Date of Patent: *Jul. 9, 2002

(54) METHOD OF LOCATING SOFTWARE OBJECTS IN DIFFERENT CONTAINERS

(75) Inventor: Anders Nilsson, Hagan (NO)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/038,381

(22) Filed: Mar. 11, 1998

(30) Foreign Application Priority Data

Aug. 14, 1997 (EP) .............................................. 97114035

(51) Int. Cl.$^7$ ................................................ G06F 9/44
(52) U.S. Cl. ...................................................... 709/315
(58) Field of Search ..................... 713/1, 100; 709/303, 709/310, 313, 315, 316; 707/103; 717/120–122

(56) References Cited

U.S. PATENT DOCUMENTS

| | | | |
|---|---|---|---|
| 5,396,626 A | * 3/1995 | Nguyen ....................... | 395/700 |
| 5,444,851 A | * 8/1995 | Woest ......................... | 709/222 |
| 5,475,817 A | * 12/1995 | Waldo et al. ............... | 709/316 |
| 5,682,532 A | * 10/1997 | Remington et al. ......... | 395/683 |
| 5,943,497 A | * 8/1999 | Bohrer et al. ............... | 395/701 |
| 5,948,072 A | * 9/1999 | Cink et al. .................. | 709/304 |
| 5,951,680 A | * 9/1999 | Redlin et al. ................ | 713/1 |

OTHER PUBLICATIONS

R. Orfali, et al, The Essential Distributed Objects Survival Guide, John Wiley & Sons, Inc, pp. 489–500. 1996.*
Fischer et al. "Cognitive Tools for Locating and Comprehending Software Objects for Reuse"—IEEE, Jul. 1991.*
Steen et al. "Locating Objects in Wide–Area Systems" IEEE, Jan. 1998.*
Gamma et al., Design Patterns: Elements of Reusable Object–Oriented Software (Addison–Wesley 1995), pp. 81–95, 107–116.

* cited by examiner

Primary Examiner—Alvin Oberley
(74) Attorney, Agent, or Firm—Roy W. Truelson

(57) ABSTRACT

A method of developing a software system using Object Oriented Technology and frameworks. The present invention addresses the problem to provide a method of locating objects in different containers, particularly to address the allocation of objects across different containers when moving all objects of a certain class does not make sense. The present invention solves this problem with a method of locating software objects in a software system across logical storage units characterized in that said locating of said objects is performed according to a usage of said objects. The present invention is applicable in the technical field of application development of software systems, e.g. for a business application as Financial or Logistic and Distribution.

5 Claims, 3 Drawing Sheets

METHOD OF LOCATING SOFTWARE OBJECTS IN DIFFERENT CONTAINERS

The present application is related to the following commonly assigned applications filed on the same date as the present application, each of which is herein incorporated by reference:

U.S. Ser. No. 09/038,024, now U.S. Pat. No. 6,106,569, by Kathryn Bohrer et al., entitled "A Method of Developing a Software System Using Object Oriented Technology";

U.S. Ser. No. 09/038,352, filed Mar. 11, 1998, by Brent Carlson et al., entitled "A Method of Using Decoupled Chain of Responsibility";

U.S. Ser. No. 09/038,351, now U.S. Pat. No. 6,070,152, by James Carey et al., entitled "Framework for Business Applications Providing Financial Integration";

U.S. Ser. No. 09/038,349, now U.S. Pat. No. 6,092,075, by James Carey et al., entitled "Framework for Business Applications Using Cached Aggregate and Specification Key";

U.S. Ser. No. 09/038,025, now U.S. Pat. No. 6,134,706, by James Carey et al., entitled "Software Business Objects in a Multi-level Organizational Structure"; and U.S. Ser. No. 09/041,114 by Brent Carlson et al., entitled "Method of Error Handling in a Framework", now issued as U.S. Pat. No. 6,052,525.

FIELD OF THE INVENTION

The present invention relates to a method of developing a software system using Object Oriented Technology and frameworks.

DESCRIPTION OF THE RELATED ART

In order to maintain or enlarge their competitiveness, enterprises of almost every type of business all over the world have to rework and bring up to date their information technology to meet customer's requirements and thus to be successful in the market. But keeping an information system based on traditionally developed software up to date is at least an expensive undertaking, and in many cases it is an unsolvable problem. Object Oriented Technology or simply Object Technology, often abbreviated "OOT" or simply "OT", has the technical potential to overcome the problems associated with development, maintenance, and extension of software applications within a company's information system and to provide interoperability and adaptability across multiple applications and hardware platforms.

Object Oriented Technology describes a method for the development of operating software as well as application software for a computer system. Contrary to the traditional, non object oriented ways of developing software, Object Oriented Technology comprises and uses preengineered "methods" and "objects" for the development of software, comparable to tools and parts for the development of an automobile.

Similar to the development of an automobile, wherein not each required screw is developed individually, but standardized screws are used which can be individually adapted by shortening to the required length, within the development of software, Object Oriented Technology provides a "class" as a kind of software template from which individual "objects" can be instantiated. These classes are usually stored in a software library or a so called "class library". A class library is simply a collection of several classes stored together in a special filing format called a library.

In Object Oriented Technology an "object" is a self-contained piece of software consisting of related data and procedures. Data means information or space in a computer program information can be stored, e.g. a name or an inventory part number. Procedures are parts of a program that cause the computer to actually do something, e.g. the parts of a program which perform calculations or the part of a program that stores something on a computer disk. In Object Oriented Technology, an object's procedures are called "methods".

The concept of an object being a self-contained piece of software having data and procedures inside itself is a new way of developing software. In non object oriented software, most of the data for an entire program is often grouped together near the beginning of the program, and the procedures then follow this common pool of data. This conventional method worked okay for smaller programs, but as soon as a piece of software started to grow and become somewhat complex, it become increasingly difficult to figure out which procedures were using which data. This made it quite difficult and expensive to debug or change traditional software programs.

In Object Oriented Technology it is generally easier to debug, maintain, and enhance object oriented software. The three most popular object oriented programming languages are probably "C++", "JAVA", and "Smalltalk". The concept that both data and methods are contained inside an object is called "encapsulation". Part of the concept of encapsulation is that an object has a predictable way of communicating with other objects, a so called predictable "interface" or sometimes also called the method contract.

Provided that interface will not be changed, the code or methods inside the object can be changed without disrupting other objects' ability to interact with that object. For example, a TAX CALCULATION object would have a predictable interface for use by PAYCHECK objects. Provided that interface will not be changed, the detailed program code inside the TAX CALCULATION object could be changed whenever the tax laws changed, and no other objects in the payroll system would have to know anything about such changes.

In Object Oriented Technology the term "inheritance" is used to communicate the concept that one inherit part of its behavior and data from another object, e.g. since an employee is a type of person, an EMPLOYEE object might inherit the characteristics of a PERSON object, such as having name, birth date, and address data, as well as an EMPLOYEE object might inherit methods for updating and displaying these data.

Even if an object inherits some of its characteristics from other objects, that object can, and usually would, also have its own non-inherited characteristics, e.g. whereas a PERSON object would have an inheritable method to display a person's address, a PERSON object would probably not have a method for displaying paycheck history, since not all persons get paychecks. Because an EMPLOYEE object could not inherit this method from a PERSON object, an EMPLOYEE object would have to define its own method for displaying paycheck history.

Although Object Oriented Technology clearly seems to be the most sophisticated way for the development, maintenance, and extension of software applications, many companies developing software applications are concerned about the cost and risks involved with the rework of existing applications and with the construction of new applications using Object Oriented Technology. For those software application developers, a technical foundation for software applications has to be built as a tool using Object Oriented Technology as the basis, allowing each developer to develop highly unique software products. This technical foundation is formed by frameworks comprising the basic application structure which software application developers previously had to develop by themselves.

In Object Oriented Technology the term "framework" is used to describe a reusable set or collection of classes which work together to provide a commonly needed piece of functionality not provided by any of the individual classes inside the framework. Thus a framework defines a specific way in which multiple objects can be used together to perform one or more task which no single object performs. In other words, a framework is a reusable, predefined and preengineered bundle of several objects which address a recurring programming problem.

Frameworks provide a way of capturing a reusable relationship between objects, so that those objects do not have to be reassembled in that same relationship every time they are needed. Frameworks provide a way of grouping multiple objects together to perform some function which should not have to be thought through each time at the underlying object level. For example, a PRINT framework would consist of all the objects necessary for a programmer to easily print something on any printer, and would probably include objects for printer selection, spooling to disk or error detection as "out of paper". Frameworks can be regarded as a group of software objects which contain a technical foundation for a software application. For example in the business field of Financial, Logistic and Distribution or Production. Although a framework represents a skeleton of a software application, usually a framework is not an executable software program.

By providing frameworks as the technical foundation for developing software applications, the following problems have to be addressed:

Applications have to support all hardware platforms and related software operating systems relevant on the market. Applications have to fulfill the requirements related to client/server configurations including the requirement for graphical user interfaces and windowing techniques. Also, applications have to offer internet compatibility and access on demand. Furthermore, applications have to provide integrated solutions with respect to installed software.

Known from the prior art, see e.g. E. GAMMA et al: "Design Patterns: elements of reusable object-oriented software", Addison-Wesley, 1995, ISBN 0-201-63361-2, is a collection of useful patterns for building up a software system using Object Oriented Technology and frameworks.

Using a common framework will cause all persistent objects to be stored in the same container. For a small system using a single server this may be a good solution. But for a larger system this cannot be used. In particular if more than one server is deployed, there is a need for a way to allocate objects on to different servers. This is necessary to distribute work between servers. Also the servers may be located in different physical locations.

Allocation of objects across different containers is particularly of interest, when moving all objects of a certain class does not make sense. The main reasons for distributing instances of a given class across several containers are:

The usage of objects are distributed across clients and the clients have different communication speed or reliability in the links to the different servers.

The instances need be stored using different storage mechanisms, thus requiring different containers. This would typically be an issue where similar objects are mapped to more than one legacy database.

During the remaining portion of the application the following terminology will be used:

Container

A container within the present application is a logical unit of storage for persistent objects. A container resides on a single server. All objects in a container are stored by the same storage mechanism, e.g. if you want some objects to be stored using a Posix persistence, some in DB/2 for NT and some in Oracle, you will need at least three containers. You may have more than one for the same storage mechanism.

Controller

A controller is an object that owns a collection of other objects. The other objects are of the same class (or at least of the same superclass). A controller appears in a similar role as the master data tables in a traditional system, e.g. there may be a Currency controller or a Business Partner controller. All containers within this application are implemented to hold one or several collections internally, but presents an interface externally that hides the complexity of this implementation detail. To the client of the controller it appears as the controller is the single "collection". There are several objects that are not owned by a controller, but by another business object. For the rest of this application an object owning a collection of other objects can be considered as a controller, even if the class is not named a controller.

Ownership

In general, objects within the present application may be owned or independent. Objects that are of a subclass of Dependent are always owned. Entities, i.e. objects that are subclasses of Entity, may be either owned or independent. The domain frameworks, i.e. Common Business Objects, General Ledger etc., are designed so that all Entities except one are owned. This single object that is not owned is the company controller, that is the root of the ownership hierarchy.

Location Object

When a new object is created the client code calls a static method on the Factory Class associated with the class of which the new object is going to be an instance of. On the creation method the client code will pass a location object (explicitly or using the owner). The new object will be created in the container where the location object is stored. The location parameter can either be an existing business object, or it can be a specific Container object specifically representing a certain Container. The domain frameworks always pass the owner as the location object.

This leads to the conclusion that all objects are located in the same Container as the Company controller.

Collection Types

There are different types of collections. Controllers may be implemented by either one of the collection types, but typically the ones with map behavior is used. In the following it is important to understand the difference between Extents and the other collection types in terms of the location aspect.

Within the accompanying figures, representation standards for classes, objects, relationships etc. are used at least partly according to Grady Booch: "Object-Oriented Analysis and Design with Applications", second edition, The Benjamin/Cummings Publishing Company, Ind., Redwood City, Calif., USA.

SUMMARY OF THE INVENTION

It is an object of the present invention to provide a technical foundation for the development of software applications using Object Oriented Technology which overcomes the above discussed problems.

It is a further object of the present invention to provide a method of locating objects in different containers, particularly to address the allocation of objects across different containers when moving all objects of a certain class does not make sense.

The present invention solves this problem with a method of locating software objects as laid down in enclosed independent claim. Particular embodiments of the present invention are presented in the respective dependent claims.

In particular, the problem is solved by a method of locating software objects in a software system, e.g. for a business application, across logical storage units, said method is characterized in that said locating of said objects is performed according to a usage of said objects.

Distributing objects across logical storage units, e.g. across containers, according to usage rather than by class allows for better performance, increased security, better availability and lower cost.

Clients may be located close to a server. In this scenario it is useful to locate objects according to how frequently they are used by different clients. Typically there will be a pattern to this. If the object is located on the server that the premier clients has the fastest communication links to, one typically gets the best performance from the system.

In a preferred embodiment of the present invention said locating is controlled by the facts whether
there are one or several of attributes passed on creation of a new object that can be used to determine a location of said new object, and whether
there is a controller for said object implemented with an extent collection.

The impact of a change to one of these attributes after the create has to be considered, i.e. the questions: does the object has to move, can this be performed now, etc.
Extents and its elements are always in the same container.
No changes are required to the client code that performs the creation.
In certain cases the relevant location object is available in the client code even if it is not passed on the creation signature. In other cases the input to the client code, typically the GUI (Graphical User Interface), must be changed to indicate the location object. Also the client code must be changed to use the new signature.
Although there is no need to class replace the controller to use multiple collections, one for each container, it may be wise to do so anyway, in particular if the controller to be used is expected to be accessed using a LOCAL or NO_LOCK access mode. There are no changes required to the client code that performs the creation.
Although there is no need to class replace the controller to use multiple collections, one for each container, it may be wise to do so anyway, in particular if the controller to be used is expected to be accessed using a LOCAL or NO_LOCK access mode. In certain cases the relevant location object is available in the client code even if it is not passed on the creation signature. In other cases the input to the client code, typically the GUI (Graphical User Interface), must be changed to indicate the location object. Also the client code must be changed to use the new signature.

The present invention comprises also a method of developing a software system using an Object Oriented Technology and a method of locating software objects as described above.

Furthermore, the present invention comprises a data storage medium characterized in that said data storage medium is storing software objects using a method of locating these as described above.

If the controller has to be replaced to support more than one collection, the following steps have to be followed:
Create a controller class that is a subclass of the controller to be replaced.
Decide if the number of collections required is a fixed number.
If it is a fixed number of collections:
Decide the number of collections.
Create attributes for the collections.
Specify what location object to be used for creating the collection.
Create a scenario for determining the collection to use for new objects.
Create a scenario for finding an instance that is held by key. In its simplest form this could be checking collection by collection, but if there are some way one could come up with a rule on how to search. Potentially one could provide a get method that takes some form of "location object", to determine which collection to look in firstly.
Create object interaction diagrams (OID) for the scenario.
If it is not a fixed number of collections:
Decide the key for the collection of collections. Consider your answer to the question of whether there are one or several of the attributes passed on creation of the new object. The key is probably the object or objects in a key that is used to decide on the container. Consider using the container object itself.
Create a scenario for determining the collection to use for new objects. On creation of a new element, if the collection does not exist, create a new empty collection.
Create a scenario for finding an instance that is held by key. In its simplest form this could be an iteration over the collections, but if there are some way one could come up with a rule on how to search. Potentially one could provide a get method that takes some form of "location object", to determine which collection to look in firstly.
Create attributes for the map of collections.
Create object interaction diagrams (OID) for the scenario.
If the controller is Root/Aggregate and there is a rule for finding existing objects and consider if the aggregating behavior should search the collections meeting the rule first for the company hierarchy, before looking in the other collections. This improves performance.
If the controller has Shared/Sharing or Root/Aggregate behavior, validate that this still works as expected. It should in most cases without change.
The coding is performed according the following:
Generate the code from a so called "Rose model".
Implement the code necessary based on the scenarios and the objects identity (OID).
Update the name configuration to have your new class replace the old one.

DETAILED DESCRIPTION

Figure 1:
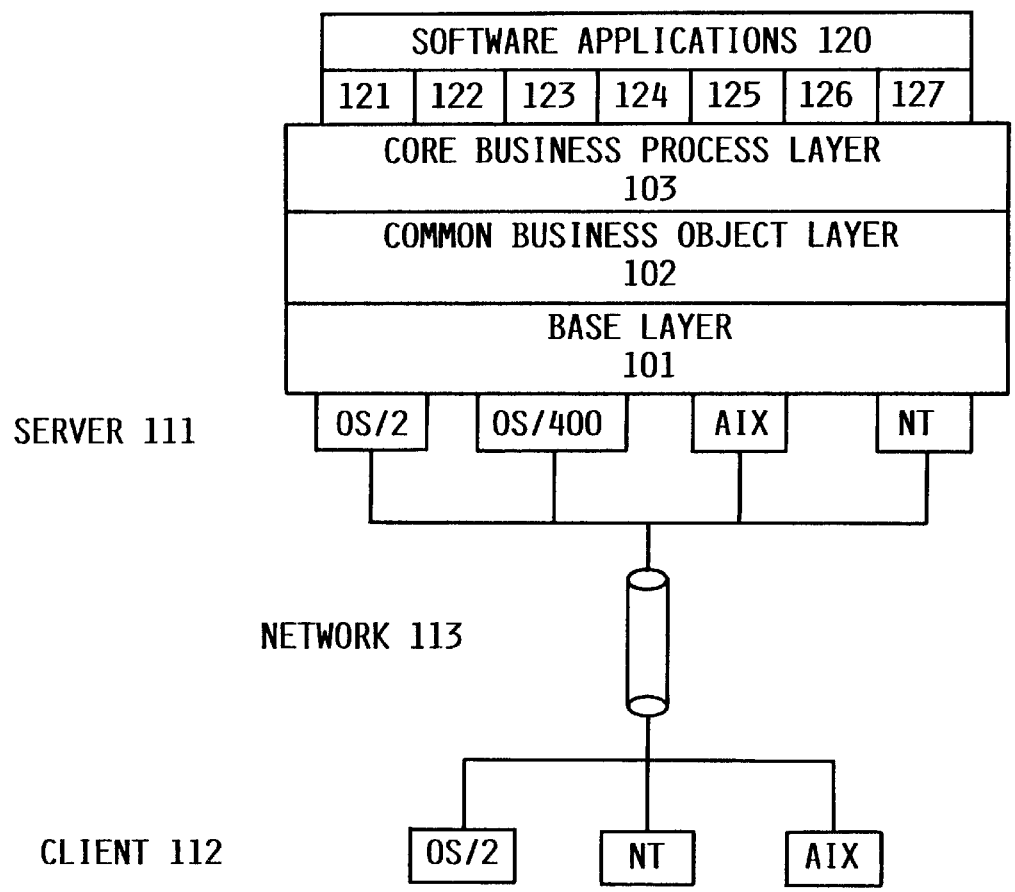
FIG. 1 shows a four layer schema from which software application can be developed using the present invention.

Developing software applications using the subject of the present invention as a development tool can be regarded as built up of three layers as shown in FIG. 1.

The lowest layer is the base layer 101. The base layer 101 provides and manages the interface with the server hardware 111 which is potentially running under different operation systems such as OS/2, OS/400, AIX, and NT. The server hardware 111 is connected with client hardware 112 via a communication network 113. The client hardware 112 may also potentially be running under different operation systems such as OS/2, NT, and AIX. The embodiment shown in FIG. 1 shows the development of the server portion of a client/server application only.

The Base layer 101 represents the technical foundation for the higher level objects including many functions near to an operating system such as finding objects, keeping track of their names, controlling access to them, resolving conflicts, security administration, and installation. The Base layer 101 also includes the so called Object Model Classes which provide a consistent model for building objects while hiding the complexity of the underlying infrastructure from the software application developer. The Base layer 101 can be regarded as a kind of lower middleware necessary for the application of the Object Technology above it using the interface functionality provided by the Base layer 101.

Above the Base layer 101 there is a layer 102 comprising Common Business Objects. This Common Business Object layer 102 provides a large number of objects which perform functions commonly needed within a business application, e.g. date and time, currency, address, units of measure, and calendar. These Common Business Objects represent the building blocks from which software application developers can select and create business applications, e.g. these Common Business Objects can be copied and extended to perform new functions, as for example the date and time object can be extended to handle the Chinese calendar.

The layer 103 above the Common Business Objects layer 102 already comprises Core Business Processes and can be regarded as the Core Business Process layer 103. Although layer 103 usually does not provide executable code, within this layer 103 the business software applications developed using the present invention begin to take shape. Each Core Business Process layer is built for one specific type of application, as for example General Ledger or Warehouse Management.

This Core Business Process layer 103 can be regarded as an upper middleware which—although not a complete software application program—already contains the basic functions which all of the application programs of this type require. It is the Core Business Process layer 103 which creates the application frameworks, wherein some of the Common Business Objects are linked to a large number of objects specific to the type of framework being built, e.g. Warehouse Management. The resulting framework is constructed in a way to contain commonly used functions as well as to be easy to extend.

On top of the above described three layer model the application software is located, created by the software application developer and representing executable code. It is the choice of a software application developer whether to use only the base layer 101, the base layer 101 and the Common Business Object layer 102, or all three layers 101, 102, and 103 for the development of his software application. In every case he has to develop a remaining part of the application by himself and therefore every resulting software application program will be a completely unique product.

It has to be noted that the subject of the present invention is represented within the three layer model 101, 102, and 103 and is not represented by the executable code of the software application 121 developed using the present invention.

Figure 2:
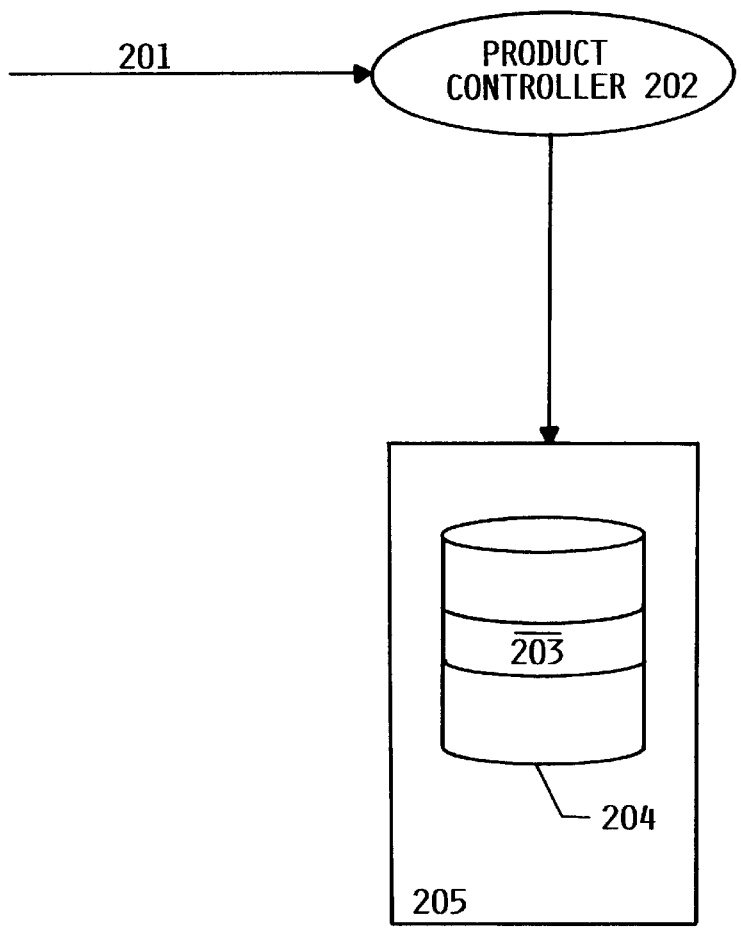
FIG. 2 shows a location of an object according to the prior art.

FIG. 2 shows a location of an object according to the prior art. Upon a Create Request 201 with provision of parameters to a Product Controller 202, a Product Object 203 is created in container 204 of system 205. When the request for creation of a product comes in the factory, which is logically a part of the controller in the illustration, all created objects are placed in the one container. The container is a logical storage unit. The container 204 exists on a computer system, wherein said computer system may have several containers. The computer system stores the information e.g. using mechanical, electrical, optical or magnetic storage means, e.g. a magnetic hard disk.

Figure 3:
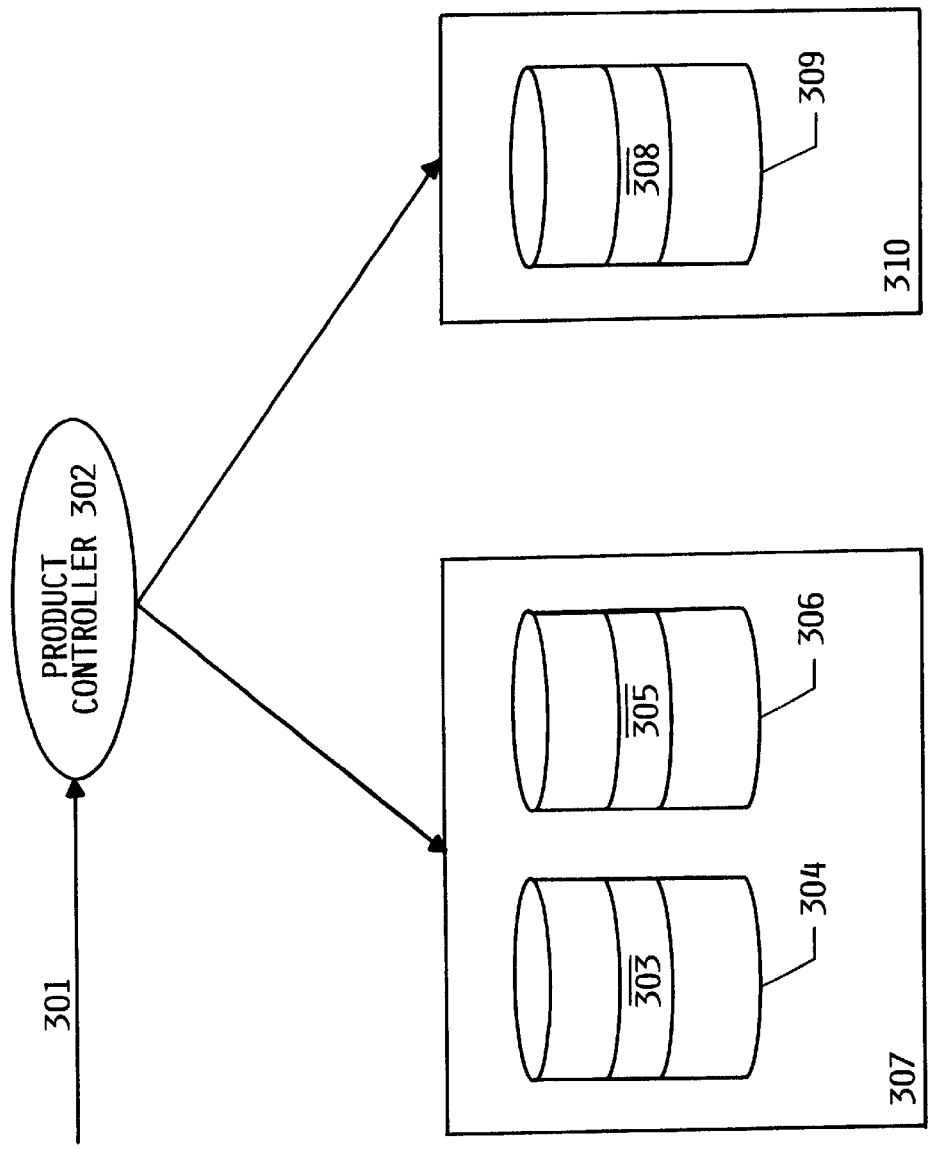
FIG. 3 shows a location of an object according to the present invention.

FIG. 3 shows a location of an object according to the present invention. The factory is changed to look at one of the parameters, the warehouse, to determine the container to use. This is done by means of passing the warehouse parameter to the object factory as the location parameter. Since the warehouse are located in the different containers, the product pertaining to a warehouse ends up in the same container. Upon a Create Request 301 with provision of parameters to a Product Controller 302, a Product Object 303 is created in container 304 or a Product Object 305 is created in container 306, both of system 307. Alternatively, a Product Object 308 is created in container 309 of system 310. All containers 304, 306, 309 are logical storage units on a magnetic hard disk of a computer system. This example illustrates the case if there are one or several of attributes passed on creation of said new object that can be used to determine said location of said new object, and if there is said controller for said object implemented with said extent collection.

What is claimed is:

1. A method of determining the initial storage location of software objects in a software system having multiple logical storage units, comprising:

calling a method in a factory class to create a new object;

determining, via a first determining step, whether there are one or more attributes passed on calling said method in a factory class to create the new object, wherein the attributes can be used to determine a storage location for initial placement of said new object;

responsive to said first determining step, if said first determining step is true, then said factory looking at said attributes passed on calling said method and determining said storage location for initial placement of said new object from said attributes;

determining, via a second determining step, whether there is a first controller for said new object implemented with an extent collection;

responsive to said second determining step, if said second determining step is true, then replacing said first controller with a second controller, said second controller being a subclass of said first controller, to use multiple extent collections, one for each container; and determining a storage location for initial placement of said new object based on usage of said objects;

wherein determining a storage location for initial placement of a new object comprises selecting a container from among a plurality of containers for initial placement of the new object.

2. The method of claim 1, further comprising:

changing client code to pass a location object.

3. The method of claim 1, further comprising:

changing a creation signature of said factory to take one or more new parameters that can be used to determine said storage location of said new object.

4. The method of claim 1, further comprising:

when said first determining step is false and said second determining step is false, then changing client code to pass in a location object.

5. The method of claim 1, further comprising:

when said first determining step is false and when second determining step is false, then changing a creation signature of said factory to take one or more new parameters that can be used to determine said location of said new object.

* * * * *